US012080503B2

(12) United States Patent
Launonen

(10) Patent No.: US 12,080,503 B2
(45) Date of Patent: Sep. 3, 2024

(54) SUBSEA FUSE ASSEMBLY

(71) Applicant: Hitachi Energy Ltd, Zürich (CH)

(72) Inventor: Markku Launonen, Vaasa (FI)

(73) Assignee: Hitachi Energy Ltd, Zürich (CH)

( * ) Notice: Subject to any disclaimer, the term of this patent is extended or adjusted under 35 U.S.C. 154(b) by 0 days.

(21) Appl. No.: 17/296,270

(22) PCT Filed: Nov. 25, 2019

(86) PCT No.: PCT/EP2019/082408
§ 371 (c)(1),
(2) Date: May 24, 2021

(87) PCT Pub. No.: WO2020/109226
PCT Pub. Date: Jun. 4, 2020

(65) Prior Publication Data
US 2022/0005661 A1 Jan. 6, 2022

(30) Foreign Application Priority Data
Nov. 27, 2018 (EP) .................................... 18208455

(51) Int. Cl.
*H01H 85/175* (2006.01)
*H01H 85/055* (2006.01)
*H01H 85/165* (2006.01)

(52) U.S. Cl.
CPC ........ *H01H 85/165* (2013.01); *H01H 85/055* (2013.01); *H01H 85/1755* (2013.01)

(58) Field of Classification Search
CPC .... H01H 85/055; H01H 85/165; H01H 85/17; H01H 85/175; H01H 85/1755
See application file for complete search history.

(56) References Cited

U.S. PATENT DOCUMENTS

| | | | | |
|---|---|---|---|---|
| 5,509,786 | A | 4/1996 | Mizutani | |
| 9,035,739 | B2 * | 5/2015 | Boe | H01H 85/0021 337/204 |
| 9,508,517 | B2 * | 11/2016 | Breili | H01H 85/175 |
| 2010/0033295 | A1 * | 2/2010 | Kent | H01B 1/12 337/405 |

(Continued)

FOREIGN PATENT DOCUMENTS

| | | | |
|---|---|---|---|
| CN | 103403834 | A | 11/2013 |
| CN | 105408980 | A | 3/2016 |

(Continued)

OTHER PUBLICATIONS

International Search Report and Written Opinion of the International Searching Authority, PCT/EP2019/082408, mailed Dec. 13, 2019, 11 pages.

(Continued)

*Primary Examiner* — Jacob R Crum
(74) *Attorney, Agent, or Firm* — Sage Patent Group

(57) ABSTRACT

The subsea fuse assembly includes an enclosure filled with a dielectric fluid and provided with an equalization opening, which is sealed with a flexible element. A first electric conductor extends into the enclosure through a first lead-through positioned in a wall of the enclosure. A second electric conductor is attached to an inner surface of a wall of the enclosure. A fuse is connected between the first electric conductor and the second electric conductor within the enclosure. A third electric conductor extends outside the enclosure and is attached to an outer surface of a wall of the enclosure. An electrically conductive path is thus provided between the second electric conductor and the third electric conductor through the electrically conductive enclosure.

10 Claims, 6 Drawing Sheets

(56) References Cited

U.S. PATENT DOCUMENTS

Figure 1:
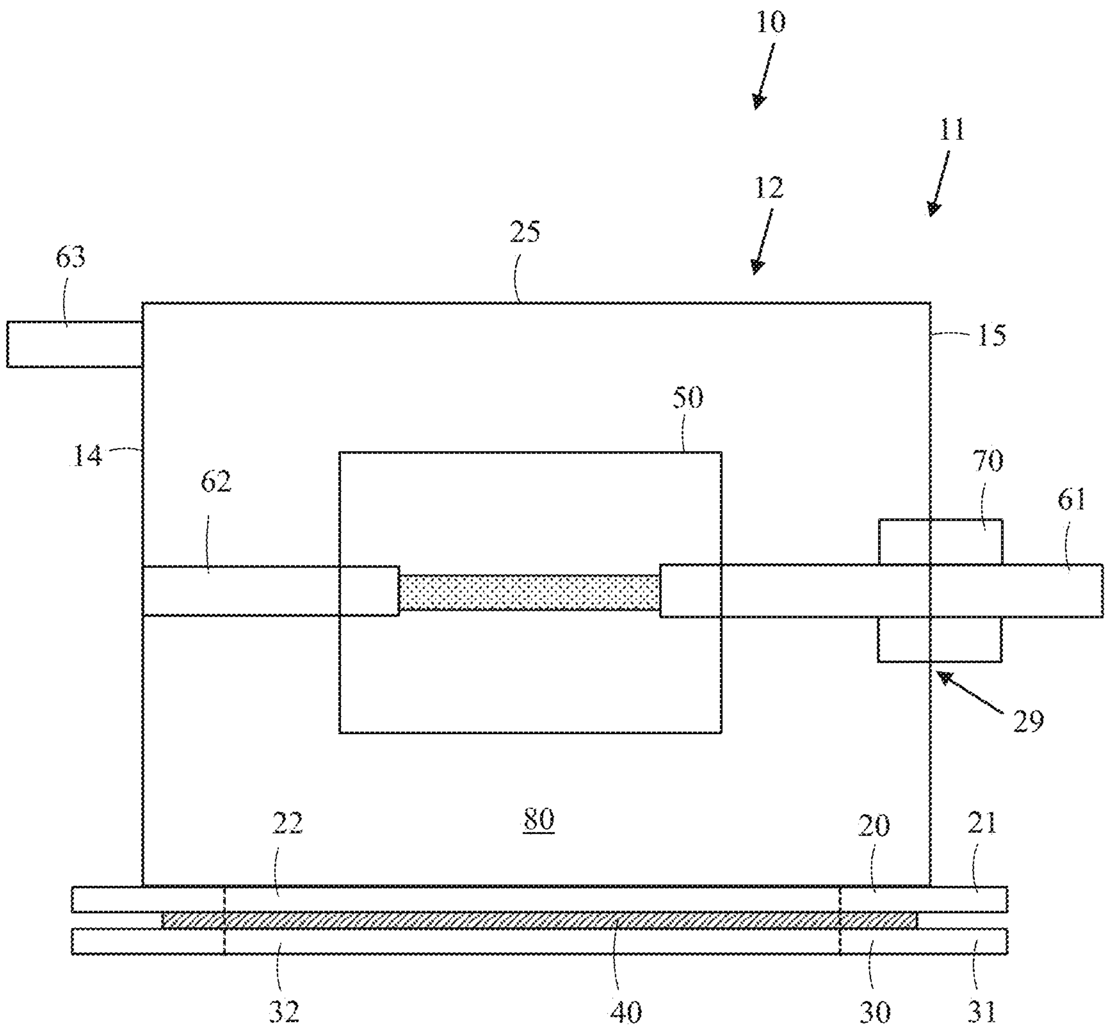

| | | | | |
|---|---|---|---|---|
| 2014/0055227 | A1* | 2/2014 | Boe | H01H 85/0021 337/1 |
| 2014/0374132 | A1 | 12/2014 | Boe | |
| 2015/0077205 | A1* | 3/2015 | Boe | H01F 27/14 336/90 |
| 2015/0091689 | A1* | 4/2015 | Nguyen | H01H 85/44 337/298 |
| 2016/0133422 | A1* | 5/2016 | Breili | H01H 85/175 337/204 |
| 2017/0155233 | A1* | 6/2017 | Aarskog | H01H 47/22 |
| 2017/0164495 | A1* | 6/2017 | Aarskog | H02M 1/32 |

FOREIGN PATENT DOCUMENTS

| | | | |
|---|---|---|---|
| CN | 106688074 | A | 5/2017 |
| EP | 2169690 | B1 | 8/2012 |
| EP | 2647026 | B1 | 1/2015 |
| JP | S52-052030 | U | 4/1977 |
| JP | H04-131841 | U | 12/1992 |
| JP | H06-017780 | A | 1/1994 |
| WO | WO 2012/116910 | A1 | 9/2012 |
| WO | WO 2017/102034 | A1 | 6/2017 |

OTHER PUBLICATIONS

Extended European Search Report, EP18208455.8, mailed May 31, 2019, 7 pages.

Office Action, Chinese Patent Application No. 201980074990.4, mailed Jul. 15, 2023, 6 pages.

Office Action, Japanese Patent Application No. 2021-529810, mailed Dec. 25, 2023, 8 pages.

* cited by examiner

SUBSEA FUSE ASSEMBLY

CROSS REFERENCE TO RELATED APPLICATIONS

This application is a 35 U.S.C. § 371 national stage application of PCT International Application No. PCT/EP2019/082408 filed on Nov. 25, 2019, which in turns claims foreign priority to European Patent Application No. 18208455.8 filed on Nov. 27, 2018, the disclosures and content of which are incorporated by reference herein in their entirety.

FIELD

The invention relates to a subsea fuse assembly.

BACKGROUND

Subsea installations are used e.g. in modern oil and gas production facilities in which the collection, separation, boosting and transport of the oil and the gas takes place on the seabed. These processes require large amounts of electric power that has to be transferred from a remote location to the subsea installation. A high need of electric power may require a high voltage in the transfer of electric power in order to minimize power losses.

A subsea installation may comprise one or several electrical apparatuses and other apparatuses used under water e.g. on the bottom ground of a sea. The subsea installation may comprise e.g. power transformers, electric motors, switchgears and frequency converters. The subsea installation may also require a power grid as well as control, monitoring and process systems.

In order to protect subsea equipment from over-currents or short-circuits, fuses may be used. A fuse interrupts an electrical circuit if the current through the fuse exceeds a certain predetermined value.

A conventional fuse may comprise a fuse body and a fuse element within the fuse body. The fuse body may be of ceramic, glass, plastic, fiberglass or the like. The fuse element may be a metal strip or wire and it may be connected between two electrical terminals of the fuse. The fuse element will melt when the current passing through the fuse element exceeds a predetermined value. The electric circuit in which the fuse is a part will thus be interrupted.

WO 2012/116910 discloses a subsea fuse assembly. The subsea fuse assembly is adapted to be operated in a pressurized environment. The subsea fuse assembly comprises an enclosure adapted to be filled with a dielectric liquid, a pressure compensator comprising a flexible element for pressure compensation, a first penetrator and a second penetrator each passing through a wall of the enclosure for leading a first electric conductor and a second electric conductor, respectively, into the enclosure and a fuse arranged inside the enclosure and connected between the first and the second conductors.

SUMMARY

An object of the invention is to provide an improved subsea fuse assembly.

The subsea fuse assembly according to the invention is defined in claim 1.

The subsea fuse assembly comprises an enclosure filled with a dielectric fluid and provided with an equalization opening in a wall of the enclosure, the enclosure being of an electrically conductive material, a flexible element sealing the equalization opening in a fluid tight manner, a first electric conductor extending into the enclosure through a lead-through positioned in a wall of the enclosure, a second electric conductor extending within the enclosure, a fuse connected between the first electric conductor and the second electric conductor within the enclosure.

The subsea fuse assembly is characterized in that the second electric conductor is attached to an inner surface of a wall of the enclosure, a third electric conductor extending outside the enclosure is attached to an outer surface of a wall of the enclosure, whereby an electrically conductive path is provided between the second electric conductor and the third electric conductor through the enclosure.

One benefit of the invention is that only one lead-through for one electric conductor is needed in the inventive subsea fuse assembly. Only one of the two electric conductors to be connected to the fuse inside the enclosure of the subsea fuse assembly has to be directed through a wall of the enclosure.

An electrically conductive path is arranged through the enclosure between the second electric conductor and the third electric conductor.

DRAWINGS

Figure 2:
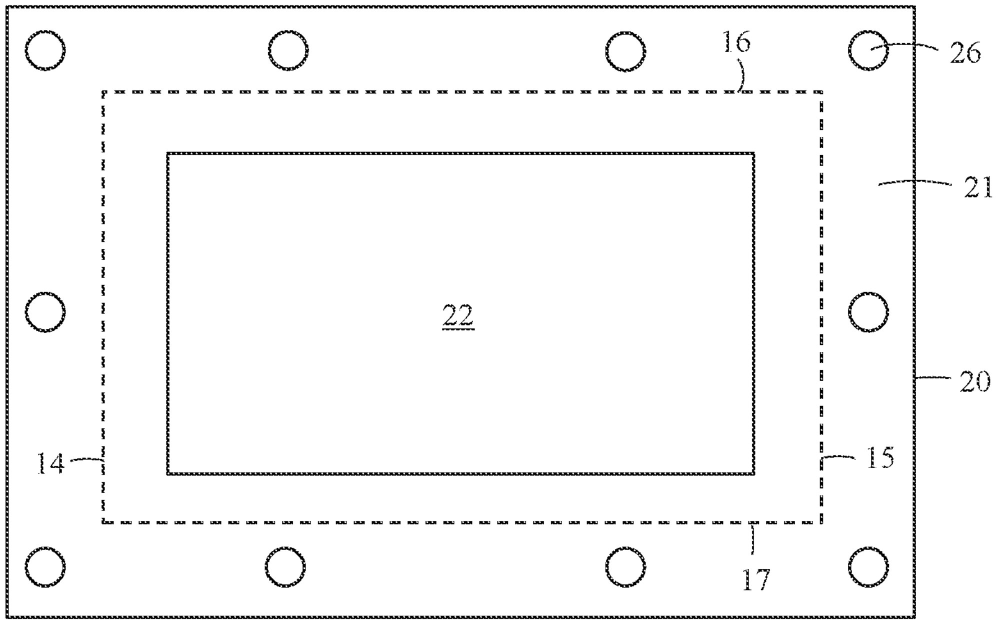
Figure 3:
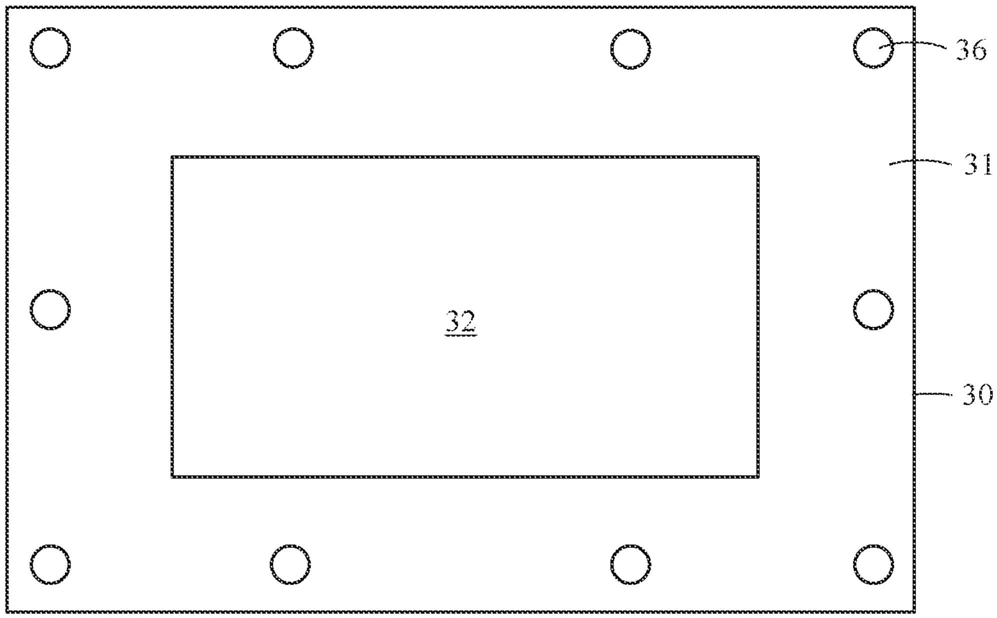
Figure 4:
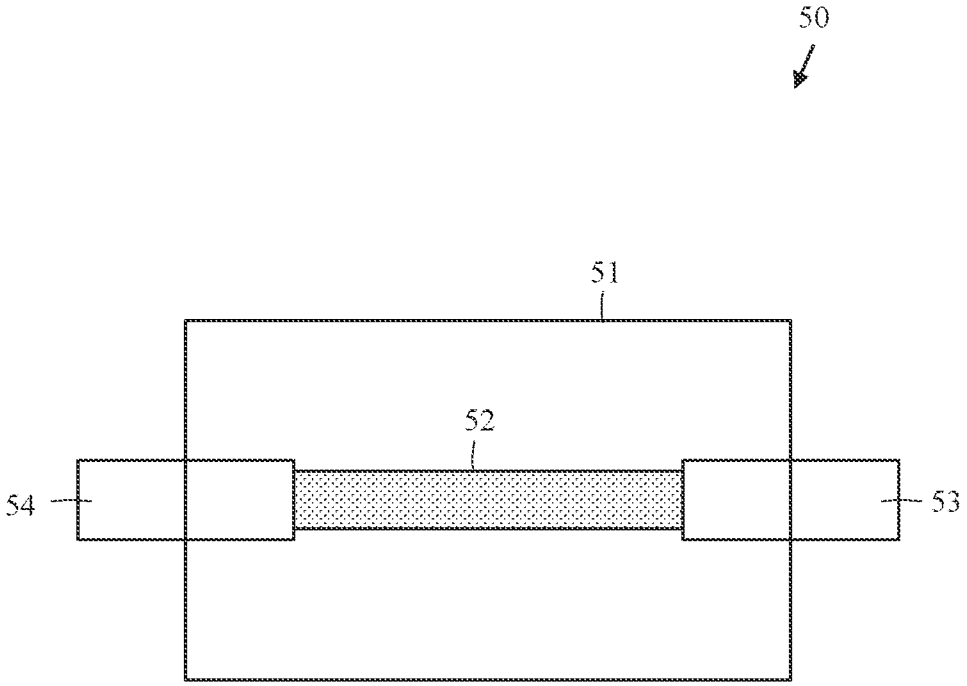
Figure 5:
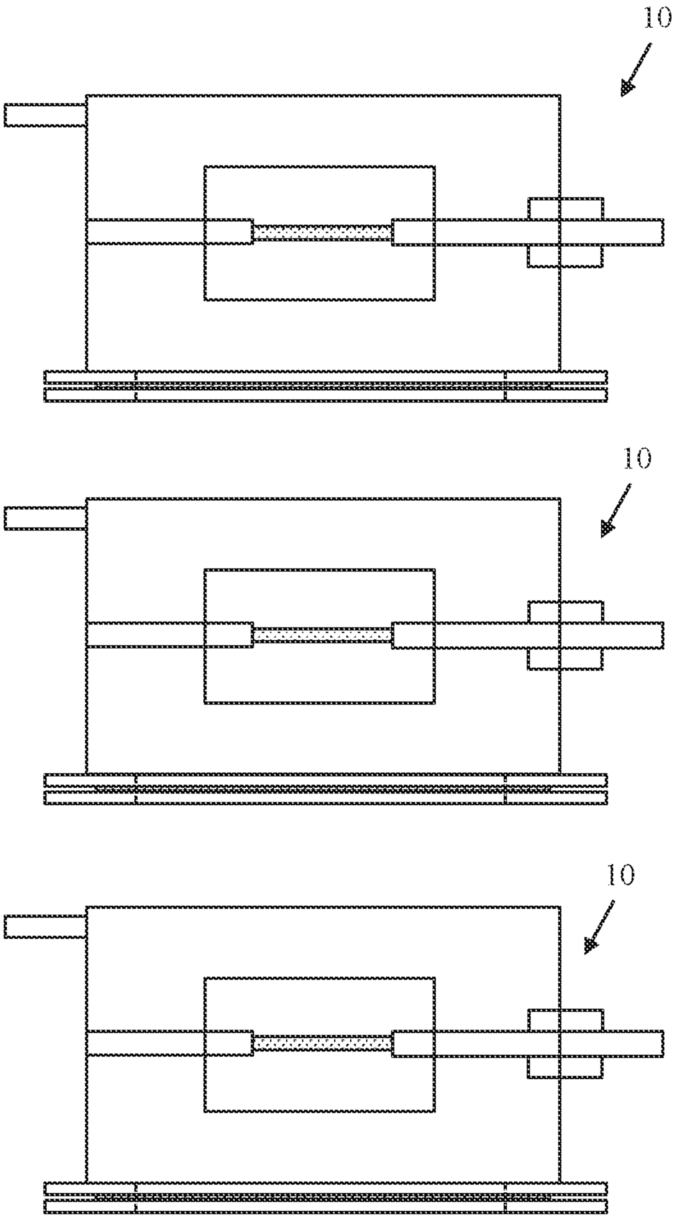
Figure 6:
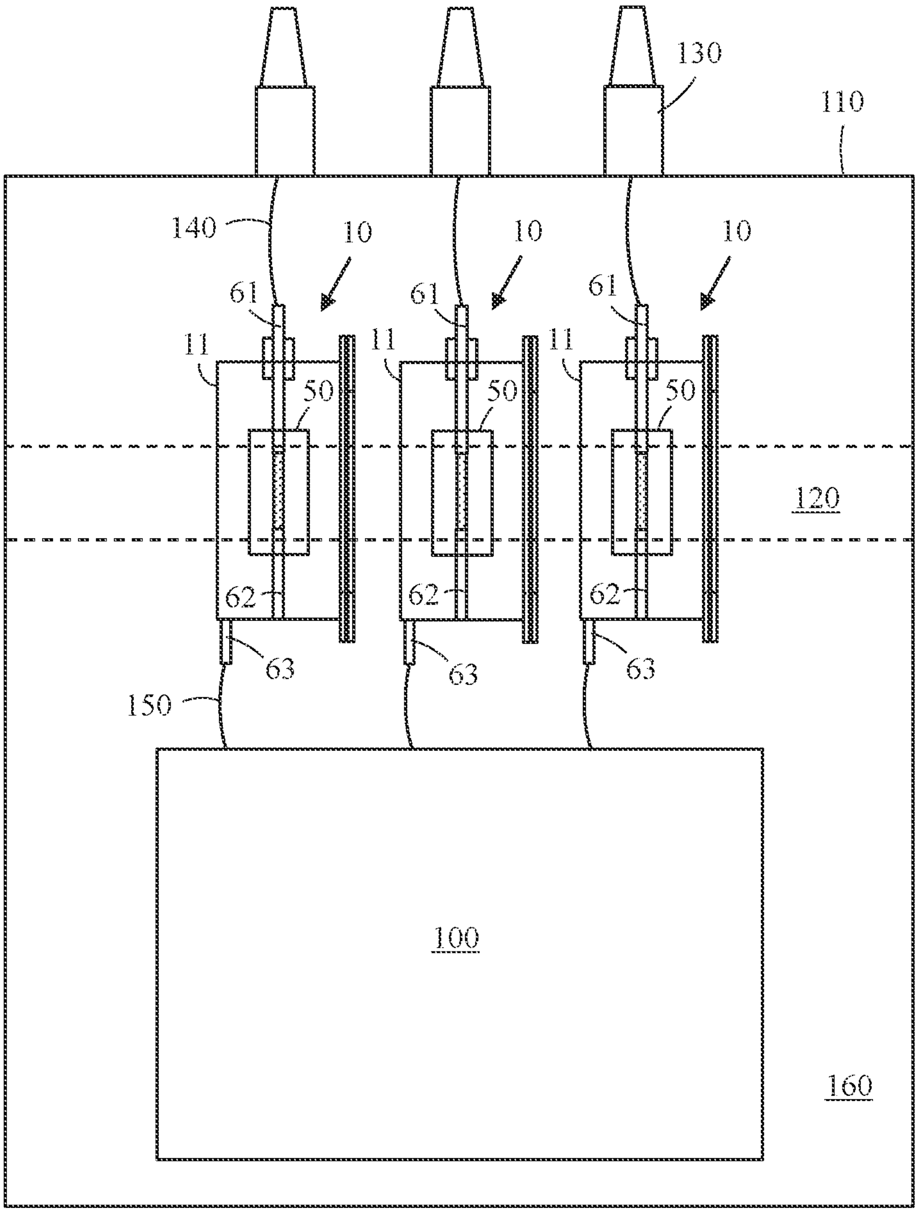
Figure 7:
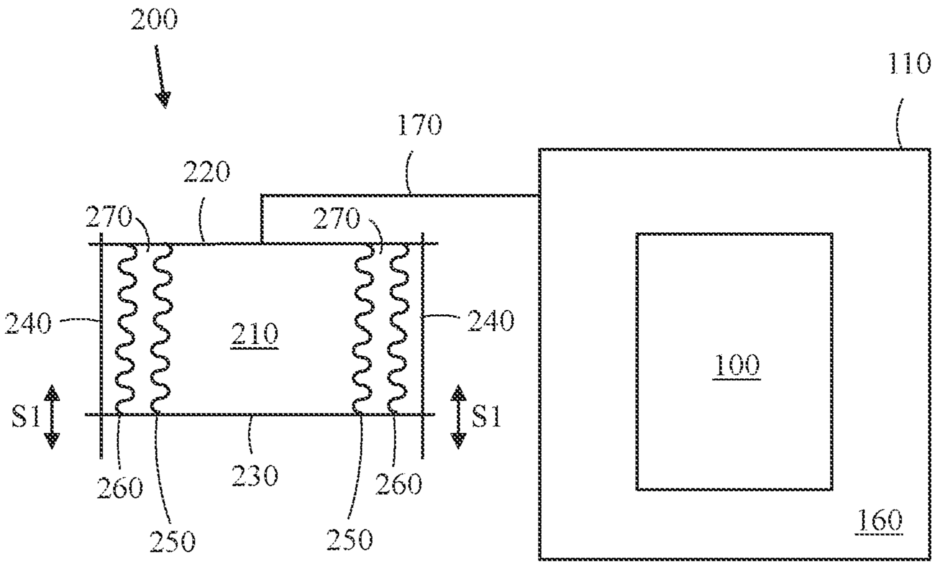

In the following the invention will be described in greater detail by means of preferred embodiments with reference to the attached drawings, in which FIG. 1 shows a side view of a subsea fuse assembly according to the invention, FIG. 2 shows a first bottom view of the subsea fuse assembly of FIG. 1, FIG. 3 shows a second bottom view of the subsea fuse assembly of FIG. 1, FIG. 4 shows a side view of a fuse in the subsea fuse assembly, FIG. 5 shows a side view of a three phase subsea fuse assembly according to the invention, FIG. 6 shows a side view of a subsea installation with a three phase subsea fuse assembly according to the invention, FIG. 7 shows a side view of a pressure compensator of the subsea installation of FIG. 6.

DETAILED DESCRIPTION

FIG. 1 shows a side view of a subsea fuse assembly according to the invention.

The subsea fuse assembly 10 may comprise an enclosure 11 having a bottom wall 20, a top wall 25, a front wall 14, a back wall 15, and side walls 16, 17 (shown in FIG. 2). The enclosure 11 may have the form of a parallelepiped. The bottom wall 20 of the enclosure 11 may extend outwards beyond an outer perimeter formed by the front wall 14 and the back wall 15. The outer portion 21 of the bottom wall 20 may form a flange. The bottom wall 20 may be provided with an equalization opening 22 forming a passage through the bottom wall 20. A mating flange 30 may further be positioned against a bottom surface of the bottom wall 20. The mating flange 30 may be of the same size as the bottom wall 20. The mating flange 30 may also be provided with an equalization opening 32 corresponding to the equalization opening 22 in the bottom wall 20 of the enclosure 11. A pressure compensator 40 may be provided between the bottom wall 20 and the mating flange 30. The pressure compensator 40 may close the equalization opening 22 of the enclosure 11. The pressure compensator 40 may form a fluid tight seal between the interior and the exterior of the enclosure 11. The pressure compensator 40 may be pressed between the bottom wall 20 and the mating flange 30. The pressure compensator 40 may be formed of a flexible element. The flexible element may be a membrane.

The back wall 15 of the enclosure 11 may be provided with a lead-through opening 29. This lead-through opening 29 may provide a passage for a first electric conductor 61 from the exterior of the enclosure 11 to the interior of the enclosure 11. A lead through 70 may be provided in the lead-through opening 29 of the enclosure 11. The lead-through 70 may be mounted in the lead-through opening 29 of the enclosure 11 so that a fluid tight seal is provided. The first electric conductor 61 may be directed through the lead-through 70 into the interior of the enclosure 11. The lead-through 70 may be made of plastic material or a resin which encloses the first electric conductor 61 and provides a fluid tight seal around the first electric conductor 61.

A second electric conductor 62 may be provided in the interior of the enclosure 11. One end of the second electric conductor 62 may be attached to the inner surface of the front wall 14 of the enclosure 11. A third electric conductor 62 may be provided in an exterior of the enclosure 11. One end of a third electric conductor 63 may be attached to an outer surface of the front wall 14 of the enclosure 11. The enclosure 11 may be made of an electrically conducting material. An electrical connection is thus formed through the enclosure 11 between the second electric conductor 62 and the third electric conductor 63. There is thus no need for an opening in the front wall 14 of the enclosure 11. The electrically conductive enclosure 11 connects the second electric conductor 62 and the third electric conductor 63 electrically together. The second electric conductor 62 is attached to the outer surface of the front wall 14 of the enclosure 11 and the third electric conductor 63 attached to the inner surface of the front wall 14 of the enclosure 11. The second electric conductor 62 and/or the third electric conductor 63 may be attached by welding to the enclosure 11. Another possibility is to attach flanges to the enclosure 11 by welding and to attach the second electric conductor 62 and/or the third electric conductor 63 with a compression joint to the respective flanges. The compression joint may be realized with a bolt and a nut.

A fuse 50 may be positioned within the enclosure 11. The fuse 50 may be electrically connected between the first electric conductor 61 and the second electric conductor 62 within the enclosure 11. A first end of the fuse 50 may be attached to an inner end of the first electric conductor 61 and a second opposite end of the fuse 50 may be attached to an inner end of the second electric conductor 62. The fuse 50 may be mechanically supported by the first electric conductor 61 and by the second electric conductor 62. The fuse 50 may be attached with screws and fastening elements or by soldering to the ends of the electric conductors 61, 62.

An outside end of the first electric conductor 61 and an outside end of the third electric conductor 63 may be connected to an external electric circuit, whereby the fuse 50 becomes a part of the external electric circuit. The fuse 50 may e.g. be connected between a first electric component which is to be protected and a second electric component supplying electric energy to the first electric component. The first electric component may e.g. be a transformer and the second electric component may be a variable drive. The fuse 50 is adapted to be triggered if a current larger than a threshold current passes through the fuse 50. Triggering of the fuse 50 means that the electric path through the fuse 50 brakes. Triggering of the fuse may e.g. mean that a fuse element provided within the fuse 50 melts, whereby the electric path through the fuse 50 brakes.

The enclosure 11 is a pressure compensated enclosure 11 due to the pressure compensator 40. The pressure compensator 40 may provide a fluid tight seal around the first equalization opening 22 in the bottom 20 of the enclosure 11. The pressure compensator 40 may provide pressure equalisation between an interior of the enclosure 11 and an exterior of the enclosure 11. The walls 14, 15, 16, 17, 20, 21 of the enclosure 11 can thus be made rather thin due to the fact that they need not withstand high differential pressures. The absence of high differential pressures further facilitates the sealing of the openings 22, 29 of the enclosure 11 by the pressure compensator 40 and the first electric conductor 61. The subsea fuse assembly 10 can thus be made relatively compact and lightweight.

The enclosure 11 may be filled with a dielectric fluid 80. The fuse 50 may thus be submerged in the dielectric fluid 80. The dielectric fluid 80 within the enclosure 11 is in direct contact with the pressure compensator 40 through the first equalization opening 22 in the bottom 20 of the enclosure 11. The pressure compensator 40 is configured to compensate volume variations of the dielectric fluid 80 within the enclosure 11 by increasing or decreasing the volume of the enclosure 11. The pressure outside the enclosure 11 acts on the other hand directly on the pressure compensator 40 through the second equalization opening 32 in the mating flange 30.

The enclosure 11 may be made of an electrically conductive material. The electrically conductive material may be metal e.g. steel. An electric insulation layer 12 e.g. several turns of crepe paper could be used around the enclosure 11. Such an electric insulation layer 12 on the enclosure 11 would, however, also form a thermal insulation reducing the cooling of the enclosure 11 and should thus be avoided.

FIG. 2 shows a bottom view of the subsea fuse assembly of FIG. 1 with the mating flange removed.

The figure shows the bottom 20 of the enclosure 11 and the first equalization opening 22 in the bottom 20 of the enclosure 11. The figure shows further with a dotted line the front wall 14, the back wall 15 and the side walls 16, 17 of the enclosure 11. The portion 21 of the bottom wall 20 that extends outwards beyond an outer perimeter formed by the front wall 14, the back wall 15, and the side walls 16, 17 may form a flange portion. The flange portion 21 of the bottom wall 20 may be provided with first fastening openings 26 passing through the flange portion 21 of the bottom wall 20. The size of the bottom wall 20 is thus greater than the size of a plate restricted by the front wall 14, the back wall 15 and the side walls 16, 17.

FIG. 3 shows a second bottom view of the mating flange of the subsea fuse assembly.

The figure shows the mating flange 30 of the enclosure 11 and the second equalization opening 32 in the mating flange 30 of the enclosure 11. The flange portion 31 of the mating flange 30 may be provided with second fastening openings 36 passing through the flange portion of the mating flange 30. The size of the mating flange 30 may correspond to the size of the bottom wall 20. The position of the second fastening openings 36 in the mating flange 30 corresponds to the position of the first fastening openings 26 in the bottom wall 20 of the enclosure 11. The size of the second equalization opening 32 in the mating flange 30 may be the same as the size of the first equalization opening 22 in the bottom wall 20 of the enclosure 11.

The mating flange 30 may be attached to the bottom wall 20 of the enclosure 11 with bolts passing through the first fastening openings 26 in the bottom 20 and the second fastening openings 36 in the mating flange 30.

FIG. 4 shows a side view of a fuse in the subsea fuse assembly.

The fuse 50 may comprise a fuse housing 51, two terminals 53, 54, and a fuse element 52. The fuse element 52 may be positioned in the fuse housing 51. The two terminals 53, 54 may pass through opposite walls into the housing 51. The two terminals 53, 54 may be electrically connected to each other via the fuse element 52. The first terminal 53 may be connected to the first electric conductor 61 and the second terminal 54 may be connected to the second electric conductor 62 in the fuse assembly 10.

The fuse housing 51 need not be fluid tight i.e. the dielectric fluid within the enclosure 11 of the fuse assembly 10 may enter into the fuse housing 51. The fuse 50 can thus be pressurized without causing damage to the fuse 50. The heating and the melting of the fuse element 52 in the dielectric liquid may create gases and combustion products. A sudden volume expansion within the fuse housing 51 may lead to the rapturing of the fuse housing 51. The fuse 50 is encapsulated in the enclosure 11 of the fuse assembly 10 i.e. the combustion products and the fragments of the fuse housing 51 will stay within the enclosure 11 of the fuse assembly 10. The environment of the fuse housing 51 will not be polluted.

The fuse element 52 may be formed of one or more solid or perforated metal sheets or of one or more wires etc. The fuse housing 51 may be made of electrically non-conducting material e.g. of a ceramic material having a high hardness and being heat resistant. The fuse housing 51 may further be filled with a dielectric e.g. with sand.

FIG. 5 shows a side view of a three phase subsea fuse assembly according to the invention.

A three phase fuse assembly can be made of three separate one phase fuse assemblies 10 as shown in the figure.

FIG. 6 shows a side view of a subsea installation with a three phase subsea fuse assembly according to the invention.

The subsea installation comprises a main tank 110 filled with a second dielectric fluid 160, a three phase transformer 100 submerged in the second dielectric fluid 160 within the main tank 110, and a three phase fuse assembly submerged in the second dielectric fluid 160 in the main tank 110.

The three phase fuse assembly comprises three separate one phase fuse assemblies 10 positioned in the main tank 110. Each subsea fuse assembly 10 may comprise an enclosure 11, a fuse 50, a first electric conductor 61, a second electric conductor 62, and a third electric conductor 63. Each of the subsea fuse assemblies 10 may be supported on a support element 120 within the main tank 110. The support element 120 may be made of an electrically non-conducting material. Each phase of a three phase power supply is connected to a respective isolated lead-through 130 attached to a top wall of the main tank 110. Each phase of the three phase power supply is further connected within the main tank 10 with a cable 140 to the first electric conductor 61 of a respective subsea fuse assembly 10. Each phase of the three phase subsea transformer 100 is connected with a cable 150 to the third electric conductor 63 of a respective fuse assembly 10. The second dielectric fluid 160 may be the same as the dielectric fluid 80 in the enclosure 11 of the fuse assembly 10 or they may be different.

The power supply is in the figure connected via the top plate of the main tank 110. The power supply could, however, instead be connected via a side plate in the main tank 110.

The transformer 100 forms an electric component within the main tank 110. The electric component could instead of a power transformer be formed of e.g. one or more electric motors, one or more switchgears or one or more frequency converters. The subsea installation could also comprise a power grid as well as control, monitoring and process systems.

The subsea fuse assembly 10 may be connected between the electric component and the power supply within the main tank 110. The subsea fuse assembly 10 forms an over-current protection for the electric component.

An insulation board comprising one or more pressboard layers may be used between the enclosures 11 of adjacent subsea fuse assemblies 10 and from the enclosure 11 to adjacent grounded parts in the main tank 110. This would improve the electrical insulation between adjacent enclosures 11 of the fuse assemblies 10 by dividing the oil gaps between the enclosures 11 and between an enclosure 11 and adjacent grounded parts into more than one area.

FIG. 7 shows a side view of a pressure compensator of the subsea installation of FIG. 6.

The main tank 110, the transformer 100, and the second dielectric fluid 160 are shown of the subsea installation. The subsea fuse assemblies 10 are not shown in the figure for clarity reasons. The second dielectric fluid 160 may be transformer oil. The main tank 110 may be filled with the transformer oil 160.

The pressure compensator 200 may have a generally cylindrical form. The pressure compensator 200 may comprise a stationary top plate 220 and a movable bottom plate 230. The bottom plate 230 may be movably supported on guide members 240 being attached to the top plate 220. The bottom plate 230 may thus move S1 along the guide members 240.

The pressure compensator 200 may further comprise a first bellows member 250 extending between the stationary top plate 220 and the movable bottom plate 230. A first bellows chamber 210 is formed by the top plate 220, the bottom plate 230 and the first bellows member 250. The first bellows member 250 forms a flexible member between the top plate 220 and the bottom plate 230. The first bellows member 250 expands and/or contracts when the bottom plate 230 moves in either direction S1 i.e. away from the top plate 220 or towards the top plate 220. The first bellows member 250 may have a substantially cylindrical form.

The pressure compensator 200 may further comprise a second bellows member 260 extending between the stationary top plate 220 and the movable bottom plate 230. The first bellows member 250 is enclosed by the second bellows member 260. A second bellows chamber 270 is formed between the first bellows member 250 and the second bellows member 260. The second bellows member 260 separates the first bellows member 250 from the surrounding sea water. The second bellows chamber 270 may be filled with an intermediate medium. The second bellows member 260 may have a substantially cylindrical form.

The first bellows chamber 210 may be connected to the main tank 110 via a pipe system 170. The pressure compensator 200 will thus compensate for the volume variations of the second dielectric fluid 160 in the main tank 110. When the volume of the second dielectric fluid 160 in the main tank 110 increases, then a portion of the second dielectric fluid 160 will flow from the main tank 110 via the pipe system 170 to the first bellows chamber 210. This will cause the bottom plate 230 to move further away from the top plate 220 so that the volume of the first bellows chamber 210 increases. When the volume of the second dielectric fluid 160 in the main tank 110 decreases, then a portion of the second dielectric fluid 160 will flow from the first bellows chamber 210 via the pipe system 170 to the main tank 110. This will cause the bottom plate 230 to move towards the top plate 220 so that the volume of the first bellows chamber 210 decreases. The pressure compensator 200 will thus compensate for the volume variations in the main tank 110.

The first bellows member 250 may be formed of a metallic bellows construction. The second bellows member 260 may be formed of rubber or rubber like material. The rubber like material may be an appropriate plastic material or a mixture of plastic material and rubber material.

The small volume changes in the second bellows chamber 270 must also be compensated. This may be done so that the second bellows member 260 is adapted to be able to expand also in the radial direction or by using a small additional pressure compensator connected to the second bellows chamber 270.

The main tank 110 may be pressure compensated with any kind of pressure compensator i.e. not only with the pressure compensator shown in the figure. The pressure compensator could be a membrane in the same way as in the enclosure 11 or a single or double bellows type pressure compensator or a bottle type pressure compensator could be used. A double bellows type pressure compensator is disclosed e.g. in EP patent 2 169 690.

The enclosure 11 is formed as a parallelepiped in the figures. This is an advantageous embodiment, but the enclosure 11 could have any form, it could e.g. be cylindrical or trapezoidal or polygonal.

The equalization opening 22, 32 is, in the figures, positioned in the bottom wall 20, 30 of the enclosure 11. This is an advantageous embodiment, but the equalization opening 22, 32 may naturally be positioned in any wall of the enclosure 11. The third electric conductor 63 is, in the figures, attached to the front wall 14 of the enclosure 11. This is an advantageous embodiment, but the third electric conductor 63 could naturally be attached to any wall in the enclosure 11. The first electric conductor 61 and the second electric conductor 62 extend from opposite walls 14, 15 of the enclosure 11 to the fuse 50. This is an advantageous embodiment, but the first electric conductor 61 and the second electric conductor 62 could extend from any wall to the fuse 50.

The subsea fuse assembly is adapted to be operated in a pressurized environment i.e. in an environment having a pressure considerably higher than the normal air pressure 1 bar. The subsea fuse assembly may e.g. be positioned on the sea bed. The subsea fuse assembly may be used in water depths in the range of 100 to 3000 m, whereby the prevailing pressure may be in the range of 10 to 300 bar. The water temperature in an ocean is typically 5 to 6 degrees Celsius in the depth of 1000 m and 0 to 3 degrees Celsius in the depth of 3000 m.

The current passing through the subsea fuse assembly may be in the range of 100 to 1000 amperes (RMS). The voltage acting on the subsea fuse assembly may be in the range of 100 to 50 000 volts (RMS).

The dielectric fluid in the enclosure may be a dielectric liquid e.g. a dielectric oil. The dielectric oil may be a transformer oil or an insulating oil. Transformer oil or insulating is an oil that is stable at high temperatures and has excellent electrical insulating properties. It may be used in oil-filled transformers, some types of high-voltage capacitors, fluorescent lamp ballasts, and some types of high-voltage switches and circuit breakers. The functions of transformer oil or insulation oil are to insulate, suppress corona discharge and arcing, and to serve as a coolant.

The enclosure 11 is filled with a dielectric fluid 80. The pressure prevailing outside the enclosure 11 will act through the pressure compensator 40 on the pressure of the dielectric fluid 80 within the enclosure 11. The pressure of the dielectric fluid 80 within the enclosure 11 will thus follow the pressure that is prevailing outside the enclosure 11. Thus a close to zero differential pressure can be maintained between the inside and the outside of the enclosure 11.

The membrane 40 may be selected from the group comprising a rubber membrane, a nitrile rubber membrane, a thermoplastic polyurethane membrane, a membrane comprising polyester filaments, a membrane comprising polyvinyl chloride, and a butyl rubber membrane.

It will be obvious to a person skilled in the art that, as the technology advances, the inventive concept can be implemented in various ways. The invention and its embodiments are not limited to the examples described above but may vary within the scope of the claims.

The invention claimed is:

1. A subsea fuse assembly comprising:
- an enclosure filled with a dielectric fluid and provided with an equalization opening in a wall of the enclosure, the enclosure being of an electrically conductive material,
- a flexible element sealing the equalization opening in a fluid tight manner,
- an electric insulation layer that comprises crepe paper and that is wrapped around the enclosure,
- a first electric conductor extending into the enclosure through a lead-through positioned in a first wall of the enclosure,
- a second electric conductor extending within the enclosure, wherein the second electric conductor is welded to an inner surface of a second wall of the enclosure that is different from the first wall of the enclosure,
- a fuse connected between the first electric conductor and the second electric conductor within the enclosure,
  - a third electric conductor extending outside the enclosure and welded to an outer surface of the second wall of the enclosure,
- wherein an electrically conductive path is provided between the first electric conductor and the third electric conductor via a serial connection of the enclosure, the second electric conductor and the fuse,
- wherein the first wall comprises a back wall of the enclosure and the second wall comprises a front wall of the enclosure,
  - wherein the second electric conductor and the third electric conductor are conductively attached to the front wall and the first electric conductor passes through the back wall, and wherein the wall through which the first electric conductor passes in the enclosure is opposite to the wall on which the third electric conductor is attached.

2. The subsea fuse assembly according to claim 1, wherein the first wall through which the first electric conductor passes in the enclosure is opposite to the second wall on which the second electric conductor is attached.

3. The subsea fuse assembly according to claim 1, wherein the flexible element is a membrane.

4. The subsea fuse assembly according to claim 3, wherein the membrane is selected from the group comprising a rubber membrane, a nitrile rubber membrane, a thermoplastic polyurethane membrane, a membrane comprising polyester filaments, a membrane comprising polyvinyl chloride, and a butyl rubber membrane.

5. A subsea installation comprising:

a pressure compensated main tank filled with a dielectric fluid, an electric component submerged in the dielectric fluid in the main tank, a subsea fuse assembly according to claim 1, the subsea fuse assembly being submerged in the dielectric fluid in the main tank.

6. The subsea fuse assembly according to claim 1, wherein the first wall is opposite the second wall.

7. The subsea fuse assembly according to claim 1, wherein the enclosure comprises a bottom wall that contacts a first side of a pressure compensator.

8. The subsea fuse assembly according to claim 1, wherein the enclosure comprises a mating flange that contacts a second side of the pressure compensator, and wherein the second side of the pressure compensator is opposite the first side of the pressure compensator.

9. The subsea fuse assembly according to claim 1, wherein the enclosure comprises a top wall that extends from the front wall to the back wall.

10. A subsea fuse assembly comprising:

an electrically conductive enclosure filled with a dielectric fluid and including a bottom wall, a front wall, a back wall that is opposite the front wall, at least one sidewall, and a bottom wall that is opposite the top wall comprises an equalization opening that forms a passage through the bottom wall;

a mating flange that is positioned against a bottom surface of the bottom wall and that is of a same size as bottom wall;

a pressure compensator is between the bottom wall and the mating flange and closes the equalization opening to form a fluid type seal;

a lead through that comprises plastic or resin and that is mounted in a lead through opening on the back wall to provide a fluid type seal;

a first electric conductor that is directed through the lead through into an interior of the electrically conductive enclosure;

a second electric conductor that is provided in the interior enclosure and comprising a first end being welded to an inner surface of the front wall of the enclosure;

a third electric conductor comprising a first end that is conductively connected to an outer surface of the front wall;

a fuse connected between the first electric conductor and the second end of the second electric conductor within the enclosure, wherein the fuse is serially connected to the second electric conductor which is serially connected to the third electric connector, wherein the fuse is mechanically supported by the first electric conductor and the second electric conductor; and an electric insulation layer that comprises crepe paper and that is wrapped around the enclosure, wherein the first electric conductor is routed from outside the enclosure to the interior of the enclosure and is electrically insulated from the enclosure via the lead through and the second electric conductor is conductively coupled to the enclosure and does not extend outside the interior, and wherein the third electric conductor is conductively coupled to the enclosure and does not extend to the interior of the enclosure.

* * * * *